April 7, 1931. E. T. BENNINGTON 1,799,209
OVERHEAD TRAVELING CARRIER
Filed Jan. 24, 1927
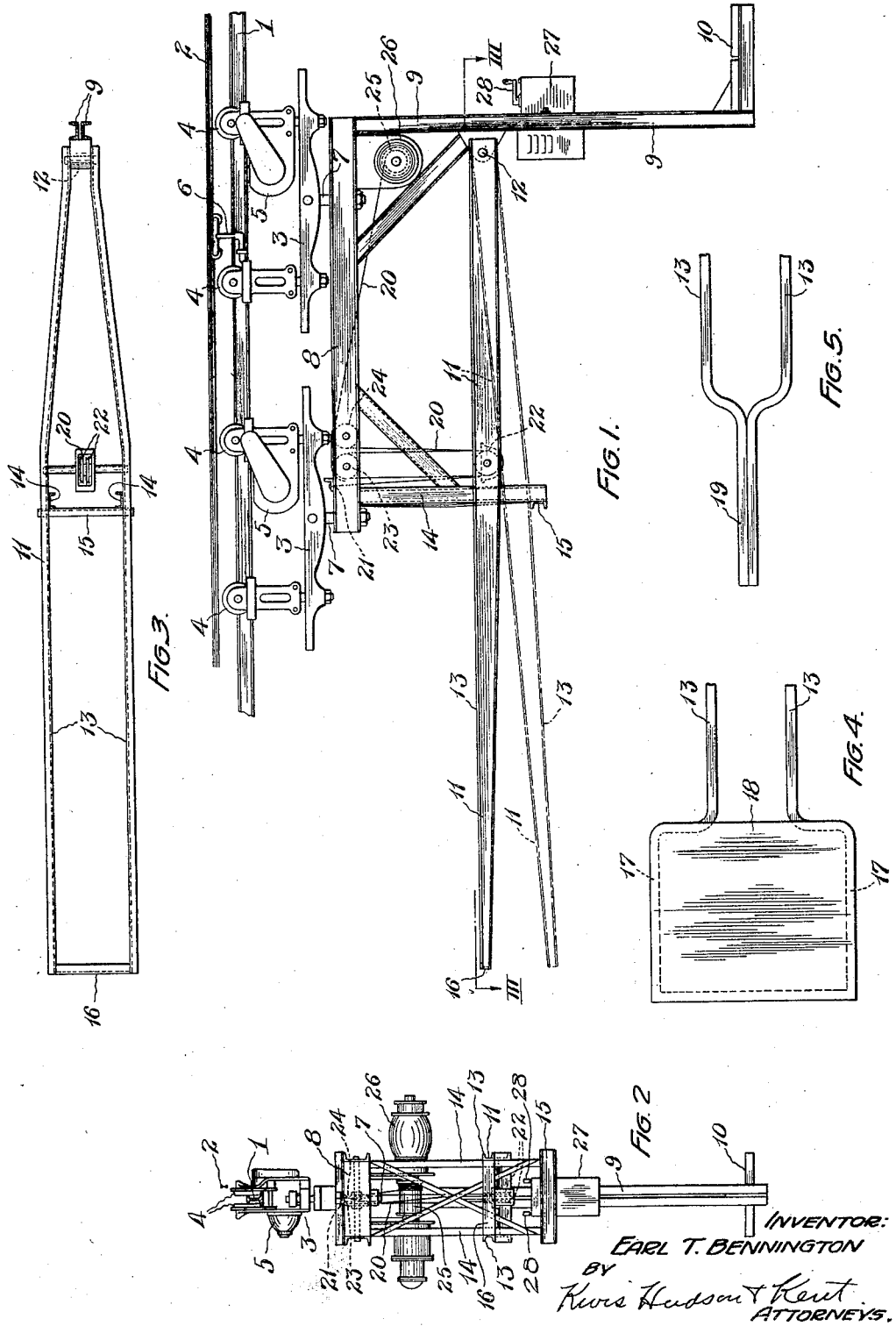
INVENTOR:
EARL T. BENNINGTON
BY
Kwis Hudson & Kent
ATTORNEYS.

Patented Apr. 7, 1931

1,799,209

UNITED STATES PATENT OFFICE

EARL T. BENNINGTON, OF CLEVELAND HEIGHTS, OHIO, ASSIGNOR TO THE CLEVELAND CRANE & ENGINEERING COMPANY, OF WICKLIFFE, OHIO, A CORPORATION OF OHIO

OVERHEAD TRAVELING CARRIER

Application filed January 24, 1927. Serial No. 163,035.

This invention relates to overhead traveling carriers, and more particularly to a furnace charging carrier for use in charging heat treating, enameling, or other types of furnaces where the temperature is too high to permit the operator or working parts of the carrier to come in close contact with the furnace.

The invention has for an object to provide a carrier for use on overhead track systems of the monorail type for charging furnaces and for conveying loads, hot or cold, through the switches, around the curves, or over transfer bridges or cranes forming a part of the overhead track system, whereby the carrier can be used in any part of the plant in which the overhead track system is installed.

Further objects are to provide a self-propelling charging carrier having a vertically movable load carrying arm for supporting the load in advance of the carrier and to so mount the operating mechanism and the operators platform as to counter-balance the load on the arm, and also to so position the operator's platform and the operating mechanism that the operator and the mechanism are protected from the heat of the furnace.

A further object is to provide a charging carrier of rugged construction in which the load carrying arm is rigidly guided and held against lateral movements with respect to the carriage frame in which it is mounted.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is a side elevation of the charging carrier;

Fig. 2 is an end elevation of the carrier;

Fig. 3 is a horizontal section taken on the line indicated at III—III of Fig. 1;

Fig. 4 is a detail plan view showing a modified form of load carrying arm; and

Fig. 5 is a detail plan view showing a further modification of the load carrying arm.

As above explained, the carrier of the present invention is designed to travel upon the track of an overhead carrier system, and in the accompanying drawings a portion of this track is shown and indicated by the numeral 1. The carrier is preferably electrically propelled, the current being furnished through a suitable conductor rail 2. The carrier is provided with front and rear trucks 3, each provided with front and rear supporting wheels which travel upon the opposite flanges of the monorail 1. For propelling the carriage, certain of the supporting wheels 4 are driven by suitable electric motors 5 mounted on the trucks, and one of the trucks is provided with a suitable conductor arm 6 which engages with the conductor rail 2 to supply current to the motors of the carrier. Each truck 3 has at the center thereof a flexibly suspended king bolt 7, and these king bolts support a load bar 8 which extends longitudinally beneath the trucks. The load bar 8 forms the top of the load carrying frame and has a vertical standard 9 rigidly secured to the rear end thereof and extending downwardly therefrom. At the lower end of the standard 9, an operator's platform 10 is rigidly secured to the standard and extends rearwardly therefrom. Between the load carrying bar 8 and the lower end of the standard 9 is a load carrying arm 11 which projects forwardly a considerable distance beyond the front end of the carrier and is pivoted at its rear end to the standard by means of a horizontal pivot pin 12. The load carrying arm is formed of two opposite side bars which diverge forwardly from the standard 9 toward the front end of the frame and extend parallel with each other forwardly of the frame. Adjacent the forward end of the load bar 8, downwardly extending vertical guide bars 14 are rigidly secured to the load bar and are positioned between the side bars 13 of the load carrying bar. The rigid guide bars 14 which are engaged by the inner faces of the side bars 13 of the load carrying arm serve to rigidly hold the load carrying arm against lateral movements with respect to its supporting frame. At their lower ends the guide bars 14 are connected by a cross bar 15 which projects beyond the outer faces of the guide bars and forms a stop for limiting the downward movement of the load carrying arm.

The forward load engaging portion of the load carrying arm may be formed in various ways, depending upon the character of the material to be handled. As shown in Fig. 3, the forward ends of the side bars may extend parallel with each other to their forward ends where they are connected by a cross bar 16; the side bars at their forward ends may have outwardly offset portions 17 upon which a suitable load supporting platform 18 is secured, as shown in Fig. 4; or the forward ends of the side arms may have forward end portions 19 offset inwardly into contact with each other to form a lifting prong, as shown in Fig. 5.

The vertically swinging load carrying arm 11 is raised or lowered by means of a hoist cable 20 which is anchored at one end to the load bar 8 adjacent the forward end thereof, as indicated at 21. The cable 20 extends downwardly from the load bar around a plurality of sheaves 22 supported on the load carrying arm between the side bars thereof and over one or more sheaves 23 mounted on the load bar directly over the sheave 22. After passing over the power multiplying sheaves on the load carrying arm and load bar, the cable passes over a guide sheave 24 mounted on the load bar rearwardly of the sheaves 23 and extends rearwardly to a winding drum 25 mounted beneath the load bar at the rear end thereof. The winding drum is operated by means of a suitable electric motor 26 which receives its current by means of suitable connections with the conductor arm 6, the hoist motor as well as the propelling motors being controlled by suitable switches mounted on the frame in position to be operated by an operator standing on the operator's platform. The motor controlling mechanism may be mounted in a controller box 27 secured to the standard 9 at a convenient height above the operator's platform 10, and the operation of the hoist and propelling motors may be controlled by operating suitable handles 28 mounted on the controller box 27.

The provision of separate supporting trucks connected to opposite end portions of the load bar by means of king bolts permits the carrier to travel around sharp curves in the overhead track system, through switches, and over cranes and transfer bridges, so that the carrier may be used in any part of the plant equipped with an overhead carrier system. The mounting of the hoist motor and winding drum and of the operator's platform on the rear end of the load bar supporting frame provides a counterbalance for a load supported upon the forward end of the load carrying arm so that the rear supporting wheels will not be lifted off the track while the load is being carried. Furthermore, the operating mechanism and also the operator are positioned at a considerable distance from the door of the furnace while the carrier is being employed for charging or discharging the furnace, and are not subjected to excessive heat.

Having thus described my invention, I claim:

1. In combination with a monorail trackway having laterally extending flanges, a suspended carrier having supporting wheels adapted to travel on said flanges, a propelling motor for driving certain of said wheels, a supporting frame comprising a horizontal top bar extending parallel with the track and a depending standard rigidly secured to the rear end of said bar, a load carrying arm pivotally connected to said standard and extending forwardly therefrom, said arm having a sheave beneath the forward portion of the top bar, a guide sheave on the top bar, a winding drum mounted on the frame adjacent the rear end thereof, a motor for driving said drum, a cable wound on said drum and extending over the sheaves on the top bar and arm and anchored at its forward end to said top bar, said cable having a supporting loop in which the sheave of the arm runs, a platform carried by the standard at the lower end thereof, and controllers for said motors mounted on the standard above the platform.

2. In combination with a monorail trackway having laterally extending flanges, a suspended carrier having supporting wheels adapted to travel on said flanges, a propelling motor for driving certain of said wheels, a supporting frame comprising a horizontal top bar extending parallel with the track and a depending standard rigidly secured to the rear end of said bar, a load carrying arm pivotally connected to said standard and extending forwardly therefrom, said arm comprising spaced side bars, hoisting means on the frame connected to said arm, vertical guide bars rigidly secured to the forward end of the top bar and extending between said side bars, and a stop bar connecting the guide bars and projecting beyond the same to limit the downward movement of the arm.

In testimony whereof, I hereunto affix my signature.

EARL T. BENNINGTON.